United States Patent [19]

Swart et al.

[11] Patent Number: 5,446,442
[45] Date of Patent: Aug. 29, 1995

[54] CIRCUIT ARRANGEMENT FOR TRIGGERING A VEHICLE PASSENGER PROTECTION SYSTEM

[75] Inventors: Marten Swart, Obertraubling; Jürgen Eigler, Regensburg; Richard Vogt, Sinzing, all of Germany

[73] Assignee: Siemens Aktiengesellschaft, Munich, Germany

[21] Appl. No.: 257,480

[22] Filed: Jun. 9, 1994

Related U.S. Application Data

[63] Continuation of Ser. No. 844,642, filed as PCT/DE 90/00215, Feb. 23, 1990, abandoned.

[51] Int. Cl.$^6$ ................................................ B60Q 9/00
[52] U.S. Cl. ...................................... 340/438; 340/436
[58] Field of Search ................. 340/438, 436, 670; 280/735; 180/282

[56] References Cited

U.S. PATENT DOCUMENTS

| | | | |
|---|---|---|---|
| 3,871,472 | 3/1975 | Hosaka et al. | 280/735 |
| 4,381,829 | 5/1983 | Montaron | 340/436 |
| 4,835,513 | 5/1989 | McCurdy et al. | 340/438 |

FOREIGN PATENT DOCUMENTS

| | | |
|---|---|---|
| 0284728 | 10/1988 | European Pat. Off. |
| 0338413 | 10/1989 | European Pat. Off. |
| 0339967 | 11/1989 | European Pat. Off. |
| 3116867 | 11/1982 | Germany |

*Primary Examiner*—Hezron E. Williams
*Assistant Examiner*—Christine K. Oda
*Attorney, Agent, or Firm*—Hill, Steadman & Simpson

[57] ABSTRACT

Circuit arrangement for triggering a vehicle passenger protection system, having a plurality of triggers (ZP1, ZP2, ZP3), through which (ZP1, ZP2, ZP3) in the event of a sufficiently serious accident a current impulse is conducted in each case, which for its part is intended to trigger the protection, one or more triggering switches (SS in FIGS. 1 and 2), the switching path of which (SS) in each case is non-conductive before the accident, and in the event of a sufficiently serious accident makes the transition to its conductive state and thus causes the current impulse through the triggers (ZP1, ZP2, ZP3), a plurality of current branches (ZP1/C2, ZP2/C5, ZP3/C9), which in each case contain at least one of the triggers, for example a primer capsule (ZP1, ZP2, ZP3), and a capacitor (C2, C5, C9), and a parallel circuit which is formed by the parallel circuit of the current branches (ZP1/C2, ZP2/C5, ZP3/C9). Before the accident the capacitor (C2, C5, C9) of each of the current branches (ZP1/C2, ZP2/C5, ZP3/C9) is connected during the journey to a voltage source (VCC30, GND according to FIG. 3), and thus is charged before the accident to an ignition voltage (approximately 30 V). The capacitor (C2, C5, C9) of each of the current branches (ZP1/C2, ZP2/C5, ZP3/C9) has both so high a self-capacitance (270μF) and, before the accident, so high an ignition voltage (approximately 30 V), that during the accident it (C2, C5, C9) delivers the current impulse with reliably sufficient energy in each case to trigger the trigger/triggers (ZP1, ZP2, ZP3) of the relevant current branch (ZP1/C2, ZP2/C5, ZP3/C9) despite any additional energy losses (in D2, D8, D11, Q6, Q9, Q13, Q16, R41, R42, R56).

18 Claims, 4 Drawing Sheets

CIRCUIT ARRANGEMENT FOR TRIGGERING A VEHICLE PASSENGER PROTECTION SYSTEM

This is a continuation of application Ser. No. 844,642, filed Mar. 31, 1992.

BACKGROUND OF THE INVENTION

The invention relates to a development of a special circuit arrangement for triggering a vehicle passenger protection system and previously disclosed per se by DE-A-2,309,111, FIG. 3. In this prior art, a parallel circuit of two current branches each having a dedicated trigger and dedicated capacitor as well as a dedicated individual triggering switch is provided, as is a common triggering switch connected in series to the triggers, it being the case that, when seen from a voltage source feeding the current branches, the capacitor is connected, as it is being charged, in each case in parallel to the assigned trigger. In the event of an accident, the capacitors generate powerful current impulses through the assigned triggers. Before the accident, the triggers are connected to floating potentials, that is to say not to defined continuous-operation voltages. Nothing is specified concerning sporadic or continuous checks of the serviceability of the most important parts of the circuit arrangement, for example its capacitors.

In the circuit arrangement according to the invention, as they are being charged the capacitors are not connected in parallel but in series to the assigned triggers. Moreover, in the invention not only the capacitors, but also the triggers are connected to definable continuous-operation voltages, it being the case that, at least in principle, the amounts of these continuous-operation voltages before the accident are sufficient to permit a certain indication of serviceability, of the primer capsule as well, because unusual continuous-operation voltages point to disturbances.

A plurality of triggering switches are also provided in the circuit arrangement described in EP-A1-0,284,728, to be precise both in series with respect to the parallel circuit, and in each case an additional dedicated triggering switch in each current branch in series with respect to the capacitor. In the event of an accident, these capacitors permit the flow of the current impulse in the relevant current branch only until this capacitor has been charged by this current flow. However, these capacitors serve not to store the energies required for triggering, but expressly the purpose of avoiding a complete discharge of an additional ignition capacitor, centrally provided there, as early as during the ignition of a first one of the primer capsules, in order for the ignition of the remaining primer capsules to be ensured as well. In addition, it follows from the figure of the abovementioned prior art that before the accident the relevant capacitors are not connected during the journey to any voltage source, that is to say are not charged to a reliably definable continuous-operation voltage. Moreover, the relevant capacitors of the current branches have in each case only approximately 20% of the capacitance of the ignition capacitor centrally provided there. Thus, in the known circuit arrangement it is really only the centrally provided ignition capacitor which before the accident stores the energy required to trigger the triggers. The capacitors provided in the known circuit arrangement thus do not store sufficient energy before the accident to be able in the event of an accident to trigger the trigger located in their current branch.

SUMMARY OF THE INVENTION

The object
of achieving an extreme reliability of the circuit arrangement despite as simple as possible a construction, the aim being that this reliability of the circuit arrangement can be checked easily before the accident as often as desired,
to be precise, despite the low outlay on circuitry
of being able not only to charge the capacitors with currents so low that the risk of unintentional defective triggering of the triggers due to excessive currents in the trigger is avoided,
but also of permitting without high outlay, above all before the accident during the journey, as well, a simple, reliable automatic and routine checking of components of the circuit arrangement that are particularly relevant to safety—for which purpose these components are connected not only to effectively definable, easily measurable continuous-operation voltages, but can also, when required, be subjected via measuring points to special test voltages or measuring currents in order if necessary to be able to establish in good time before an accident whether and where in the circuit arrangement there is a cause of a defectively non-triggering trigger, that is to say of a defectively non-triggering primer capsule, for example
and of guaranteeing later, as soon as an accident actually occurs, reliable triggering of all triggers or of all primer capsules, owing to the fact that in the event of an accident effective decoupling of the current branches can be achieved, as well as that in the event of an accident the energies stored in the capacitors can be utilized particularly effectively to generate powerful short current impulses,
and, additionally, of avoiding the central ignition capacitor which, to be precise, in the event of an accident would require particular care for the distribution of its energy to the different triggers of the different current branches,
is achieved according to the invention. The present invention is a circuit arrangement for triggering a vehicle passenger protection system, for example an air bag and/or belt lock system, in the event of a sufficiently serious accident, having a voltage source which before the accident feeds a parallel circuit of at least two current branches, having in each case a dedicated trigger, for example a primer capsule, in each current branch, this trigger conducting, during the accident, a current impulse which for its part is to trigger the protection, that is to say the inflation of an air bag, for example, having in each case a dedicated capacitor charged before the accident by the voltage source, in each current branch, this capacitor having both a high enough self-capacitance (for example 270 μF) and, before the accident, a high enough ignition voltage (for example 30 V) that during the accident it delivers to the assigned trigger a current impulse having sufficient energy to trigger the protection despite any additional energy losses, having decoupling elements, for example resistors, which are inserted into the current branches and during the accident mutually decouple the current impulses flowing inside these current branches through the relevant capacitor and the relevant trigger, having individual triggering switches, which are individually assigned to each current branch and in each case are connected in these current branches between the decoupling elements, on the one hand, and the capacitors and triggers, on the other hand, the switching path, non-conductive before the accident, of these individual triggering switches making the transition during the accident to its conductive state and thereby in each case permitting the current impulse through the trigger of the relevant current branch, and having at least one common triggering switch, which is inserted in series with the triggers or individual triggering switches and whose switching path, which is non-conductive before the accident, makes the transition to its conductive state during the accident and thus permits the current impulses through the triggers, wherein each of the current branches contains a series circuit of the capacitor and the trigger as well as at least a single measuring point, the capacitor and/or the trigger of each series circuit being connected before the accident by means of the voltage source to continuous-operation voltages which can be tested via such measuring points, and the switching paths of the individual triggering circuits in each case bridge the series circuits which are formed from the relevant current branch and the common triggering switch/triggering switches, the common triggering switch/triggering switches being inserted in series with respect to the parallel circuit or to the individual triggering switches, in such a way that during the accident the individual triggering switches permit in a low-resistance fashion in each case the current impulse of the relevant capacitor through the triggers individually assigned to them.

In the invention—as in DE-A-2,309,111, FIG. 3—the current impulse is triggered only if at least two triggering switches are simultaneous conductive, to be precise the individual triggering switch in one of the current branches as well as the common triggering switch connected in series thereto during the current impulse.

However, the invention does not only permit the continuous-operation voltages to be used to indicate serviceability. In addition, the invention permits a measuring current through only selected components of the circuit arrangement before the accident by closing in each case only one of these two triggering switches, the effects of the measuring current at corresponding measuring points provided for this purpose in the invention being measurable—measurable, for example, as a differential voltage generated thereby across the selected component, for example across the primer capsule thus selected, this differential voltage then being a measure of the (instantaneous) resistance, that is to say the primer capsule resistance, for example. To be precise, to the extent that these measuring currents hereby flow directly through the triggers, they are too weak to trigger these triggers, because these triggers are not triggered until the powerful current impulses. In addition, the temporal variation of the voltage then measurable at the resistors or measuring points can also serve as a measure of the (instantaneous) capacitance of a relevant capacitor of the relevant current branch.

Thus, the invention permits testing in good time, carried out at least from time to time and hence particularly accurate, of the serviceability of the most important parts of the circuit arrangement due to the fact that the serviceability of the components particularly relevant to safety can be checked before the accident in a manner that can be repeated automatically and routinely frequently via measuring points, due to the fact that in each current branch at least the continuous-operation voltages, generated by the voltage source, can be tested on the series circuits.

Moreover, the invention manages without a centrally arranged ignition capacitor of high capacitance. Instead of this, the invention has per current branch at least one (ignition) capacitor provided there, which then has a correspondingly lower capacitance. To be precise, instead of storing the ignition energy in the sole central capacitor and in the event of an accident achieving the decoupling of the triggers from one another in a complicated fashion either via mechanical switches or via ignition current limitations, in the invention the trigger/triggers of each current branch is/are triggered by (ignition) capacitors individually assigned to these current branches and connected according to the invention in a special way, and by their individual triggering switches connected in a special way. To the extent that a decoupling of the current branches during triggering is additionally advisable or necessary in the invention, this can be performed, as will be shown later with reference to an example, in a very simple way, for example also via resistors and/or rectifiers.

As shown by the example according to the invention explained in more detail below, moreover there is, surprisingly, no need for the capacitance of the (ignition) capacitors of the invention to be greater than the capacitance of the capacitors provided in the known current branches—in the invention their capacitance can even be smaller than that of the known capacitors, although the central ignition capacitor is not required in the invention!

According to the invention, it is not absolutely necessary for the triggers, that is to say the primer capsules, for example, of the current branches to trigger only one and the same type of protection system. In the circuit arrangement according to the invention, a portion of the triggers can, for example, trigger one or more air bags while, by contrast, another portion of the triggers can trigger belt locks and/or one or more roll bars.

Incidentally, as already indicated in the abovementioned prior art, the different individual triggering switches can trigger the relevant triggers simultaneously or else consecutively graded in time.

Additional advantages and features of the present invention are as follows:

During the checking of a current branch and while a measuring current flows via a measuring point through components of this current branch that are relevant to safety, the switching path either of the relevant individual triggering switch or of the common switch is non-conductive. This permits the serviceability of the individual components of the measurement sections formed thereby, that is to say the triggering switches and other components connected thereto, to be checked during operation without the risk existing of thereby inadvertently triggering the triggers.

The circuit arrangement contains a plurality of measuring points, whose potential is briefly checked before the accident during the operation of the vehicle, at least once upon starting the engine. Further switches are provided which during checking apply one or more test potentials to defined switching points of the circuit arrangement in order to measure the potentials of the measuring points thereby produced. Potentials applied to components of the circuit arrangement via one or more measuring points simulate informative potentials, to be precise potentials occurring at least approximately at these components during fault-free operation during the accident. This permits particularly accurate testing, carried out at least from time to time, of the serviceability of the most important parts of the circuit arrangement.

The circuit arrangement contains at least one evaluation circuit which logs the triggering behavior in the event of an accident. These subsequently permit reliable pronouncement on the correct and defective behavior of the circuit arrangement—possibly also of the driver—even a long time after the accident.

The circuit arrangement contains a programmable microprocessor which controls at least a portion of the switches. This permits in an elegant way, a particularly simple, low-complexity hardware design of the circuit arrangement.

The microprocessor also checks the potentials of the measuring points, and upon discovering a defect displays this discovery to the passenger/passengers. This additionally permits the passengers to be warned against defects in the passenger protection system in good time with a low outlay on hardware.

During the accident the capacitors deliver the current impulse consecutively in time one immediately after the other via the assigned triggers by means of the individual triggering switches controlled by the crash sensor or sensors. This permits optimization to be achieved of the instants at which protection systems individually assigned to the different passengers are to be triggered.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, and in which:

DESCRIPTION OF THE PREFERRED EMBODIMENT

The figures thus show by way of example a preferred circuit arrangement for triggering a passenger protection system, for example an air bag system and/or belt lock system, of a vehicle.

Figure 1:
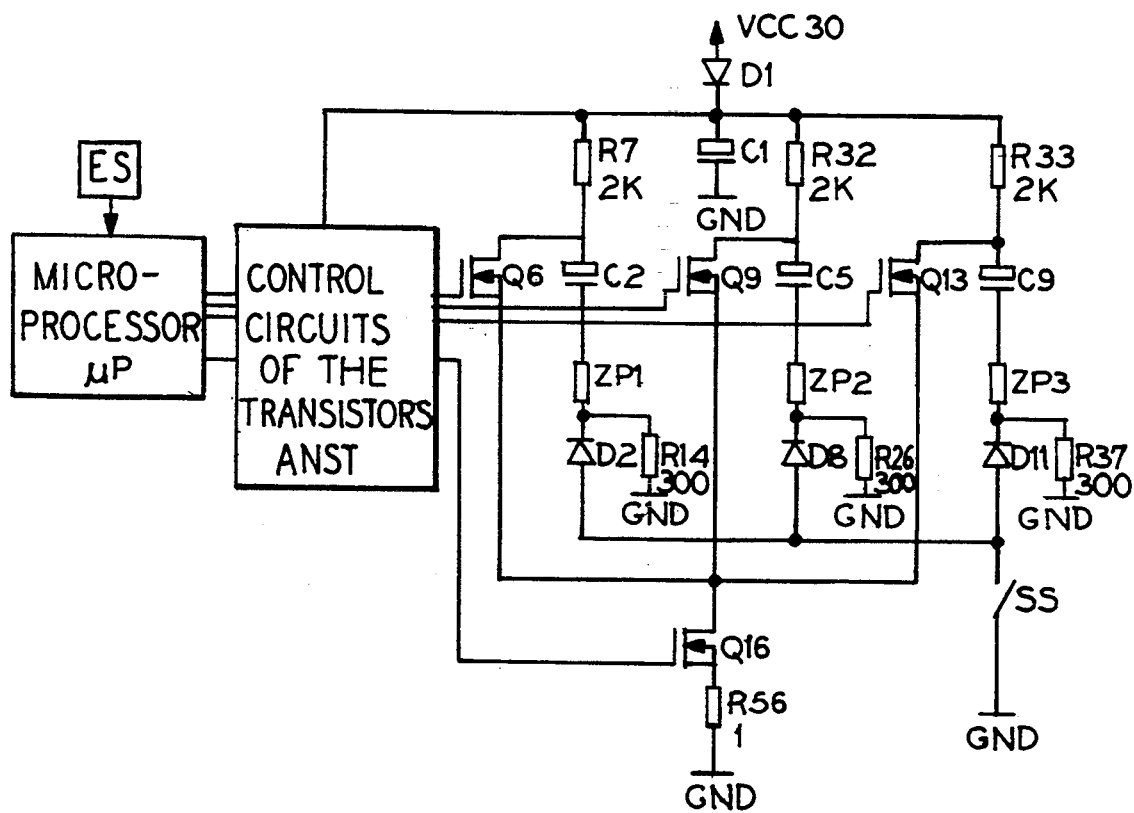
FIG. 1 shows an application of the invention to trigger three air bags by means of three triggering circuits.
Figure 2:
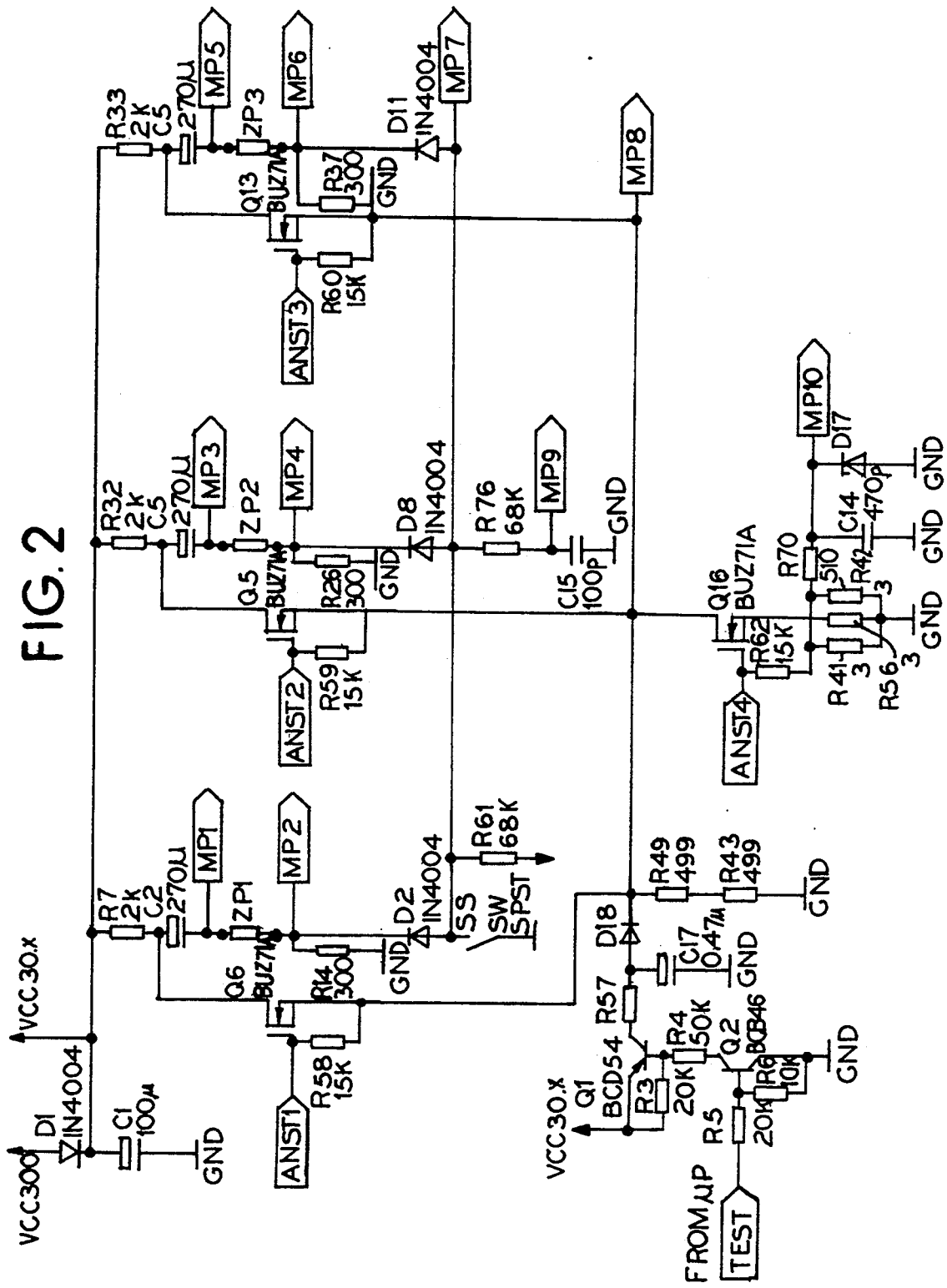
FIG. 2 shows the circuit of FIG. 1 in more detail, or those circuit parts which are to the right of "control circuits of the transistors" ANST (FIG. 1)

The system contains three triggers/primer capsules ZP1, ZP2, ZP3, which are shown in FIGS. 1 and 2 and through which in the event of a sufficiently serious accident a current impulse is conducted in each case, which for its part triggers the protection, that is to say the inflation of air bags, for example.

FIGS. 1 and 2 further show three current branches ZP1/C2, ZP2/C5, ZP3/C9, which in this case each contain a primer capsule ZP1, ZP2, ZP3 and the capacitor C2, C5, C9 as a series circuit. The three current branches form a parallel circuit which is located between the terminals VCC30 and GND of a power supply source.

Figure 4:
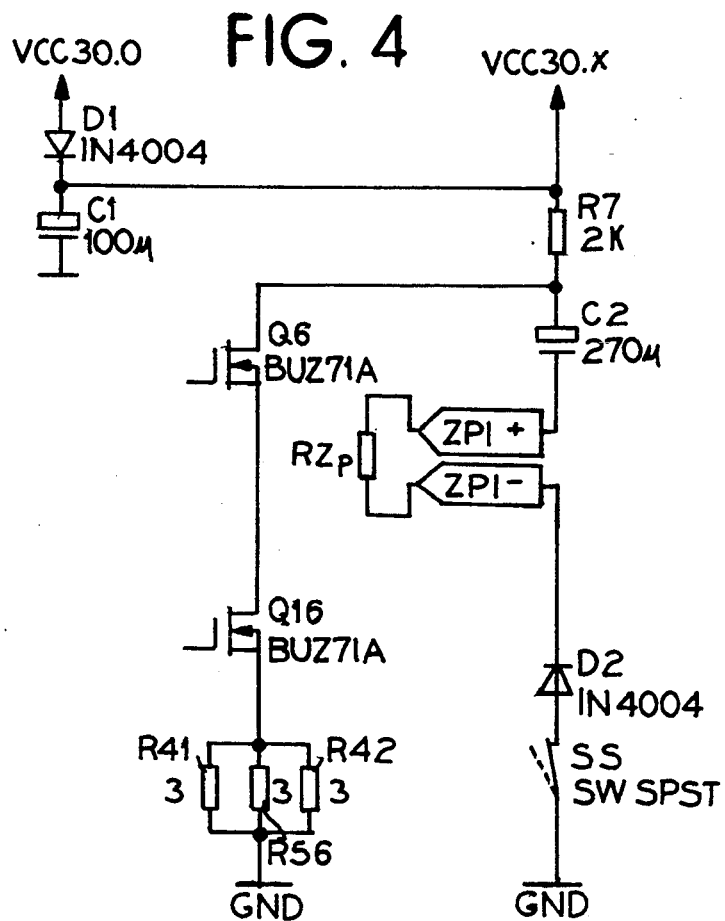
FIG. 4 shows details in the case of discharging the ignition capacitor shown in FIG. 1, and FIGS. 5 and 6 show the control circuits ANST of the transistors shown as a block in FIG. 1, compare also the indications correlated therewith relating to controls ANST in FIG. 2.

FIGS. 1 and 2 further show a triggering switch SS whose switching path is in each case non-conductive before the accident and makes the transition to its conductive state in the event of a sufficiently serious accident and thus causes the current impulse via the primer capsules ZP1, ZP2, ZP3, partly directly—cf., for example, the detail of FIG. 2 in FIG. 4—for example via SS-GND-R41/R56/R42-Q16-Q6-C2-ZP1-D2, partly indirectly by means of the microprocessor $\mu$P; to be precise, the microprocessor detects, for example particularly via the measuring points MP7, MP9 scanned by the microprocessor $\mu$P, that the triggering switch SS of the crash sensor has become conductive, whereupon during the accident the microprocessor $\mu$P drives the switching paths of the switches Q16, Q6, Q9 and Q13 into their conductive state at once (either simultaneously or consecutively graded in time one immediately after the other).

Figure 3:
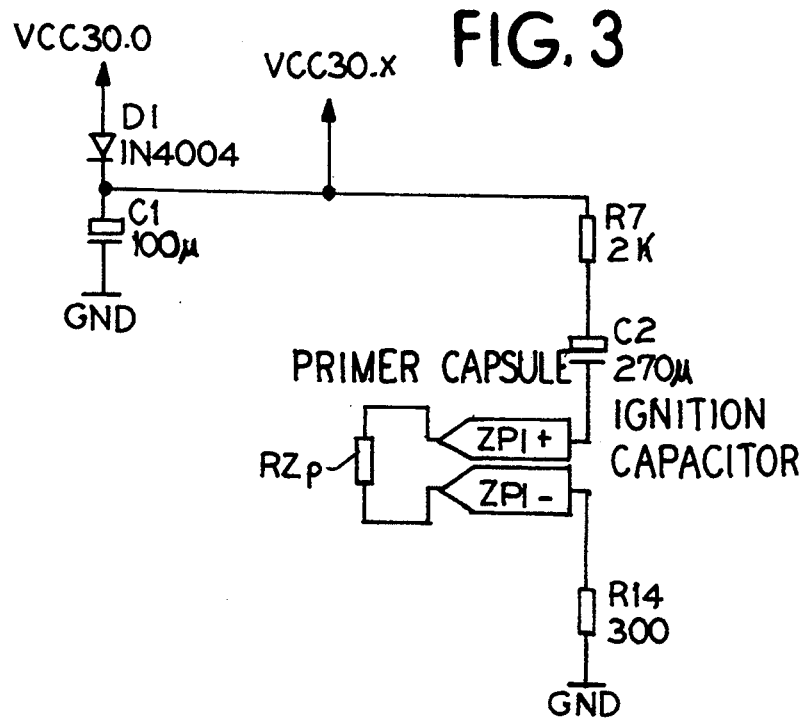
FIG. 3 shows details of charging the ignition capacitor of one of the three triggering circuits.

Thus, in the example shown before the accident during the journey the capacitor C2, C5, C9 of each of the current branches ZP1/C2, ZP2/C5, ZP3/C9 is connected via one or more high-resistance resistors, here R7/R14, R32/R26, R33/R37, to the voltage source VCC30, GND—cf. also this operating phase sketched in FIG. 3—in such a way that these capacitors C2, C5 and C9 are consequently charged before the accident to their ignition voltage, here approximately 30 V. The charging is performed via such high-resistance resistors that the triggers ZP1, ZP2, ZP3 then (in the example shown) inserted serially in the charging circuit are still not able to trigger. In this case, each capacitor C2, C5, C9 of each current branch ZP1/C2, ZP2/C5, ZP3/C9 has both so high a self-capacitance, here 270 $\mu$F, and, before the accident, so high an ignition voltage, here approximately 30 V, that during the accident each capacitor C2, C5, C9 delivers the current impulse with reliably sufficient energy to the primer capsule ZP1, ZP2, ZP3 respectively assigned to it. The capacitances and the ignition voltage, and thus the energies stored before the accident in these capacitors C2, C5, C9 are even sufficient in each case reliably to trigger the assigned primer capsules ZP1, ZP2, ZP3 of the relevant current branch (ZP1/C2, ZP2/C5, ZP3/C9), despite any perceptible additional energy losses in D2, D8, D11, Q6, Q9, Q13, Q16, R41, R42, R56.

The energy required for igniting the three primer capsules ZP1, ZP2, ZP3 is thus stored in the dedicated capacitors C2, C5, C9 of these current branches. The capacitances of these three capacitors are selected such that in the worst case their stored energy is sufficient in itself for a reliable ignition.

The details from FIG. 1 and 2 that are shown in FIGS. 3 and 4, that is to say the component reference symbols of the first current branch ZP1/C2, are used for the following considerations. The corresponding other reference symbols would be applicable for the other current branches.

Thus, the charging of the capacitor C2 is performed according to FIG. 3 with high resistance via the resistors R7, R14 and the primer capsule, because the switching path of the switch Q6 is then non-conductive. The final voltage value of the charging, that is to say the ignition voltage, is approximately 29.4 V in the case of an operating voltage of 30 V, because of the voltage drop at the diode D1.

The charging time constant $t_0$ is thus yielded from the formula:

$$t_0 = (R7 + R14 + RZp) \cdot C2 = 620 \text{ ms.}$$

Approximately $5t_0 = 3.1$ s thus pass until the capacitor C2 is fully charged.

Assuming in accordance with experience gained that ignition is already ensured at a capacitor voltage of 20 V, when all the components are dimensioned as shown in FIG. 3 a time of only approximately 700 ms elapses after the circuit arrangement has been switched on until the device is ready for use.

However, during discharging of the capacitor C2, that is to say during the accident, the switching path of the switches Q6, Q16 and SS is conductive. GND potential is then applied to the positively charged side of the capacitor, as a result of which in a then low-resistance triggering circuit a substantial portion of the ignition voltage of this capacitor C2 is now present via the primer capsule; compare this now with the detail of FIGS. 1 and 2 shown in FIG. 4. The discharge of the capacitor C2 during the ignition of the primer capsule ZP1 is thus performed via the low-resistance current path from the positive pole to the negative pole of the capacitor C2 as follows: switched-through MOSFET Q6-switched-through MOSFET Q16-current impulse detection resistors R41/R42/R56-closed safing sensor/-crash sensor SS-diode D2-primer capsule ZP1.

The current impulse flowing through the primer capsule is thus essentially limited in the case of ignition only by the current impulse detection resistors, the channel resistances of the MOSFETs and the primer capsule resistance itself.

It may be mentioned in passing that there are advantageously always two transistors/MOSFETs in series in this circuit (as in the two other current branches ZP2/C5, ZP3/C9), so that before the accident, for example when starting the vehicle, the switching path of one of these two MOSFETs may always be switched through for test purposes, while the switching path of the second MOSFET remains non-conductive and for its part prevents the ignition of the primer capsule during this test process. The safing sensor/crash sensor SS is additionally located during this test process in the current path shown in FIG. 4, and for its part prevents a defect in the electronics, that is to say, for example, the defective conductance of the switching path of one of the two switches Q16, Q6 from triggering during a test an ignition that is not intended per se. This also holds true for a test of the two other current branches of the example shown in FIGS. 1 and 2.

A plurality of measuring points MP1 to MP10 are shown in FIG. 2. Their potential can be checked by the microprocessor $\mu P$ for test purposes during operation of the vehicle, particularly when it is being started. In order to render this checking even more reliable, it is additionally possible to apply test signals to a plurality of defined circuit points during checking, compare, for example, the potential inputs TEST, ANST1 to ANST4, also the potential inputs ZK1, ZKA111, ZKA112, ZKCom shown in FIGS. 5 and 6; it may be mentioned in passing that at least a portion of these potential inputs can additionally be used to control the circuit arrangement in normal operating times as well, that is to say before the accident or during the accident. Chiefly via the potential input TEST, compare FIG. 2, it is possible to apply a test voltage, here half of VCC30, that is to say 15 V, to the measuring point MP8 for a short time by means of the switch Q1, in order to simulate the start of an accident and observe it at the current impulse detection resistors R41/R42/R56 = here 1 Ohm by means of the measuring point MP10—and this also reliably permits the switch Q16 to be tested.

More precisely than FIG. 2, FIG. 1 shows that the MOSFET Q16 and the parallel-connected current impulse detection resistors R41/R42/R56 already mentioned above are used jointly for all current branches. The outlay for these components is therefore low.

Figure 5:
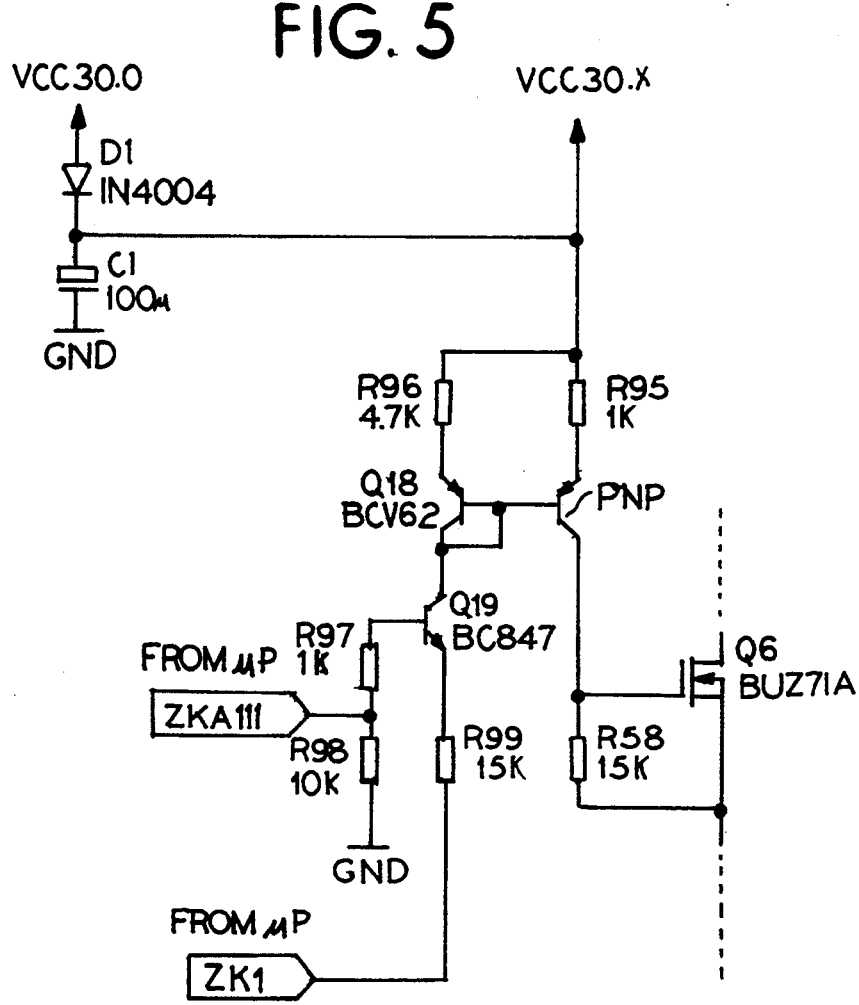
Figure 6:
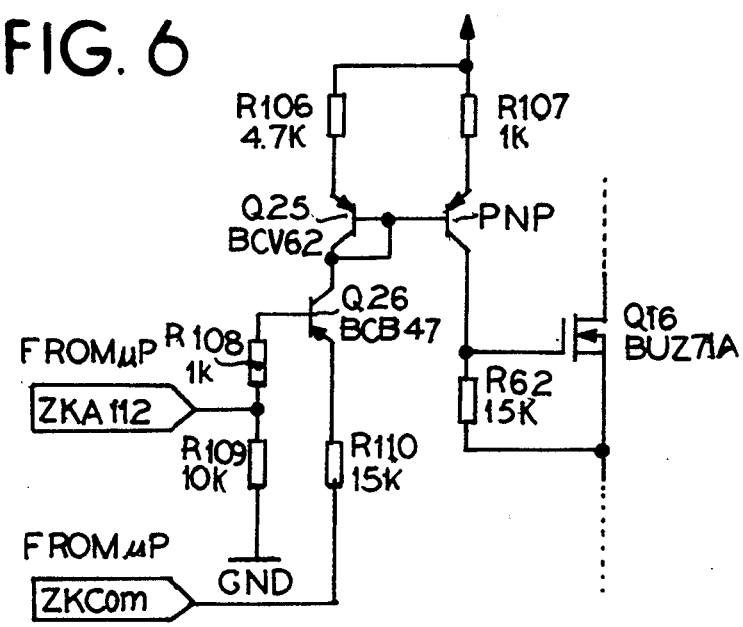

In the example shown, during the accident the switching paths of the two MOSFETs Q16 and Q6 are switched through in the current path, as has been explained with reference to FIG. 4. The control circuit ANST shown in FIG. 1 is connected upstream of each of the MOSFETs Q16, Q6, Q9, Q13, of which there are four in total here, compare in FIG. 2 the corresponding references to the potential inputs ANST 1 to ANST4, which represent outputs of the control circuits ANST shown in FIG. 1. In order to switch through a MOSFET, use is made here, for example, of two complementary signals to the processor; FIGS. 5 and 6 show such examples for the design of the relevant control circuits ANST—in FIG. 5 only in part for the first current branch with the MOSFET switch Q6; in the two other current branches the control circuits ANST are designed and operated in the same way as in FIG. 5.

The high-active potential input ZKA111 shown in FIG. 5 is provided jointly for the three switches/transistors Q6, Q9, Q13 controlling the triggering. The potential input ZK1 shown in FIG. 5, and the corresponding potential inputs ZK2 and ZK3 assigned to the two other switches Q9, Q13 serve to control the current impulse generation of the individual assigned capacitors C2, C5, C9. For its part, the switch/transistor Q16 common to all current branches has the control inputs ZKA112 and ZKCom shown in FIG. 6, and serves the purpose of additional joint control of the current impulse generation of the individual capacitors of the current branches, as has been explained with reference to FIG. 4.

Complementary signals are fed simultaneously to the potential input pairs ZKA111/ZK1, ZKA111/ZK2, ZKA111/ZK3, ZKA112/ZKCom when the relevant switches Q6, Q9, Q13, Q16 are controlled to produce the said current impulse, as FIGS. 5 and 6 show. This use of in each case two complementary signals prevents a defect of the microprocessor $\mu P$ such that all its inputs/outputs are switched high or low from leading to defective triggering. Moreover, this use of complementary signals avoids difficulties during the reset phase of the microprocessor $\mu P$, in which the microprocessor $\mu P$ sets its output lines to high via an internal pull-up resistor.

Regarding the possibility
- of measuring the current impulses by means of the circuit arrangement shown, and
- of possibly once again respectively interrupting—for example by switching off the switches Q6, Q9 or Q13—these current impulses in each case after sufficient certainty that the respectively relevant trigger/primer capsule triggered,
- of possibly also logging these current impulses-for example in a memory of the microprocessor $\mu P$, reference may be made to the following, to be precise including chiefly also to different dimensioning possibilities and different possibilities for the definition of threshold values of the current impulse:

Even when a current impulse flows only through a single one of the triggers/primer capsules, according to FIGS. 1, 2 and 4 this current impulse generates at the three parallel-connected current impulse detection resistors R41/R42/R56 a voltage drop with a maximum value of approximately 7 V. In the example shown, this voltage drop is limited by R70 and D17 to approximately 3.5 V, and is conducted via the measuring point MP10 shown in FIG. 2 to a microprocessor interrupter input. This interrupt can, for example, serve to break off the current impulse by means of the switches Q6, Q9, Q13. However, this interrupt input of the microprocessor $\mu P$ can now be defined differently, particularly by means of the software stored in the microprocessor $\mu P$:

If this interrupt input is defined as a TTL input, an interrupt is reliably triggered when a voltage $>2$ V is applied. This therefore corresponds to a current impulse of $>2$ A. The circuit arrangement shown can thus detect whether the current impulse reached at least approximately 2 A.

If this interrupt input is programmed as a CMOS input however, a high level is detected at $>0.7$. VCC, that is to say at $>3.5$ V. In this case, an interrupt is thus not generated until an ignition current $>3.5$ A.

In the example shown in the figures, the current branches contain the primer capsules and the capacitors as a series circuit in each case. The capacitors C2, C5, C9 are then not only easy to charge and easy and quick to discharge during the accident. In addition, the most important components of the circuit arrangements are very effectively testable, even during operation of the vehicle. The invention thus manages without the central ignition capacitor, and therefore also does not need additional special decoupling measures between the different current branches in order to achieve reliable triggering of the remaining triggers despite short circuiting in a triggered trigger.

A further improvement of the circuit arrangement according to the invention is also possible due to the fact that it is not only a single safing sensor/crash sensor which triggers the discharge of the capacitors C2, C5, C9. In order to increase the reliability against defective ignitions, for example in the case of driving through potholes as well, it is additionally possible to provide further safing sensors/crash sensors, the circuit arrangement preferably discharging the capacitors C2, C5, C9 only when at least two of the safing sensors indicate the accident. A further improvement is possible when not all these sensors have an identical design, but a different design. Thus, for example, the electronic sensor ES shown in FIG. 1 can additionally be provided, the switch SS shown in this figure then being, for example, a component of a mechanical safing sensor. If the microprocessor $\mu P$ is used, as shown in FIG. 1, to evaluate the temporal variation of the output signal of the electronic sensor ES as to whether the temporal variation really is typical of an accident (that is to say, for example, not typical of a pothole in the road), the reliability against defective triggerings of the protection system is further increased.

The invention and its developments thus permit a long list of advantages to be achieved:

1. The circuit arrangement is suitable for triggering a passenger protection system, in which one or more current branches are connected in parallel, each of these current branches having a dedicated energy store.
2. The decoupling is performed in each case inter alia by a high-resistance resistor connected in series.
3. The triggering is performed with the aid of switches/transistors Q6/Q9/Q13, on the one hand, and Q16, on the other hand, and of an additional, for example mechanical, sensor-controlled switch SS.
4. If only one switch controlled by the control circuits ANST and normally triggering per se the ignition current of a current branch—for example, only Q6 in FIGS. 2 and 4—closes, but the joint switch Q16 does not close simultaneously, only a measuring current flows via the resistor R49/R43 shown in FIG. 2, being measurable at the measuring points MP8, and a current that is too weak to trigger the trigger/primer capsule flows through the relevant primer capsule of the relevant current branch, being measurable at the measuring points MP1/MP2 shown in FIG. 2 as a differential voltage across the relevant primer capsule, and this differential voltage it then a measure of the (instantaneous) primer capsule resistance. The temporal variation of the voltage then measured at the resistor R49/R43 or at the measuring point MP8 is furthermore a measure of the capacitance of the relevant capacitor—C2, C5, C9—of the relevant current branch.
5. In the event of an accident, the level or the temporal variation of the respective current impulse can be measured at the current impulse detection resistor R41/R56/R42 by means of the measuring point MP10.
6. It is possible by means of the series circuit Q6/Q16 or Q9/Q16 or Q13/Q16 and by switching through in each case only a single one of these four switches Q6, Q9, Q12, Q16 to test each current branch without there being the risk of defective triggering. The switch SS controlled by the safing sensor ensures that no undesired triggering takes place in the event of a defect in the circuit arrangement.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A circuit arrangement for triggering a vehicle passenger protection system in a vehicle having an engine in the event of an accident, comprising:
   a voltage source operatively connected to a parallel circuit having at least two current branches,
   current branches of said at least two current branches each having a dedicated trigger, wherein a respective dedicated trigger of a respective current branch of said at least two current branches conducts, during the accident, a current impulse,
   said current branches of said at least two current branches each having a dedicated capacitor charged by the voltage source, each dedicated capacitor of said dedicated capacitors of said at least two current branches having both a high self-capacitance and a high ignition voltage, wherein during the accident a respective dedicated capacitor of said respective current branch delivers to the respective dedicated trigger the current impulse that triggers the protection system, current branches of the at least two current branches each having a decoupling element, wherein during the accident decoupling elements of said at least two current branches mutually decouple current impulses flowing in said at least two current branches, said current branches of said at least two current branches each having an individual triggering switch, a respective individual triggering switch of said respective current branch being connected in parallel to said respective dedicated trigger and said respective dedicated capacitor wherein the respective individual triggering switch is conductive during the accident thereby permitting the respective current impulse to flow through the respective dedicated trigger and at least one common triggering switch, which is connected in series with individual triggering switches of the at least two current branches, wherein the at least one common triggering switch is conductive during the accident thereby permitting the respective current impulse to flow through the respective dedicated trigger, said current branches of said at least two current branches each having at least one measuring point connected in series with the capacitor thereof and the dedicated trigger thereof, at least one of the capacitor and the dedicated trigger of each current branch being connected before the accident by means of the voltage source to continuous-operation voltages which are testable via said measuring point; and in each of said current branches of said at least two current branches the decoupling element thereof, the capacitor thereof, the trigger thereof and the measuring point thereof forming a series circuit.

2. The circuit arrangement as claimed in claim 1, wherein for checking operation of the respective current branch, a measuring current flows through the respective current branch via the at least one measuring point of the respective current branch, the individual triggering switch of the respective current branch and the common triggering switch being non-conductive during the checking operation.

3. The circuit arrangement as claimed in claim 1, wherein the circuit arrangement further comprises a plurality of further measuring points, potentials of the plurality of further measuring points being measured during operation of the vehicle, at least upon starting the engine.

4. The circuit arrangement as claimed in claim 3, wherein the circuit arrangement further comprises defined switching points and test switches which apply at least one test potential to the defined switching points of the circuit arrangement in order to measure the potentials of the plurality of further measuring points.

5. The circuit arrangement as claimed in claim 4, wherein said test potentials are applied to circuit elements of the circuit arrangement via said defined switching points and wherein said test potentials simulate actual potentials occurring at least approximately at these circuit elements during fault-free operation during the accident, said circuit elements being at least said dedicated triggers and said dedicated capacitors of said at least two current branches.

6. The circuit arrangement as claimed in claim 1, wherein the circuit arrangement further comprises:
at least one evaluation circuit which logs triggering operation of circuit elements of the circuit arrangement during an accident, said circuit elements being at least said dedicated triggers and said dedicated capacitors of said at least two current branches.

7. The circuit arrangement as claimed in claim 1, wherein the circuit arrangement further comprises:
a programmable microprocessor which controls at least a portion of the individual triggering switches of the at least two circuit branches and the at least one common triggering switch, the programmable microprocessor being operatively connected to the individual triggering switches of the at least two circuit branches and to the at least one common triggering switch.

8. The circuit arrangement as claimed in claim 7, wherein the circuit arrangement further comprises:
a plurality of further measuring points, potentials of the plurality of further measuring points being measured during operation of the vehicle, at least upon starting the engine; and wherein
the microprocessor also checks the potentials of the plurality of further measuring points against predetermined values and displays any substantial variations therefrom.

9. The circuit arrangement as claimed in claim 1, wherein the circuit arrangement has at least one crash sensor and wherein during the accident respective capacitors deliver respective current impulses consecutively in time one immediately after the other, via respective triggers by means of respective individual triggering switches controlled by the at least one crash sensor, the at least one crash sensor being operatively connected to the respective individual triggering switches.

10. A circuit arrangement for triggering a vehicle passenger protection system in a vehicle having an engine, the triggering occurring during an accident involving the vehicle, comprising:
a voltage source operatively connected to a parallel circuit having at least two current branches;
current branches of said at least two current branches each having a dedicated trigger, a dedicated capacitor and a decoupling element connected in series, a dedicated trigger of a respective current branch of said at least two current branches activating said protection system in response to a current impulse supplied by a dedicated capacitor of said respective current branch of said at least two current branches during an accident, each dedicated capacitor having a predetermined capacitance and being charged with a predetermined ignition voltage;
said current branches of said at least two current branches each also having an individual triggering switch, a respective individual triggering switch of said respective current branch being connected across said respective dedicated trigger and said respective dedicated capacitor of said respective current branch;
at least one common triggering switch connected in series with said parallel circuit;
means for switching at least one of individual triggering switches of said at least two current branches and for switching said at least one common triggering switch from a non-conductive state to a conductive state, whereupon a capacitor in a current branch of said at least two current branches having the at least one of said individual triggering switches that has been switched into said conductive state discharges and supplies a current impulse to a dedicated trigger in said current branch having the at least one of said individual triggering switches that has been switched into said conductive state, said means for switching being responsive to the occurrence of the accident;

a plurality of measuring locations having potentials that are measured at least once upon a starting of the engine in the vehicle, current branches of said at least two current branches each having at least one measuring location of said plurality of measuring locations; and test switching means for applying at least one test potential to defined switching points of the circuit arrangement in order to measure said potentials at said measuring locations.

11. The circuit arrangement as claimed in claim 10, wherein the circuit arrangement further comprises at least one evaluation circuit that records triggering operation of the individual triggering switches and the common triggering switch during the accident.

12. The circuit arrangement as claimed in claim 10, wherein said means for switching is a programmable microprocessor that is operatively connected to individual triggering switches of said at least two current branches and said at least one common triggering switch.

13. The circuit arrangement as claimed in claim 12, wherein the circuit arrangement further comprises a display, and wherein the programmable microprocessor checks the potentials of measuring locations of said plurality of measuring locations at least during the starting of the engine of the vehicle and displays on said display any deviations from predetermined potentials.

14. A circuit arrangement for triggering a vehicle passenger protection system in a vehicle having an engine, the triggering occurring during an accident involving the vehicle, comprising:

a voltage source operatively connected to a parallel circuit having at least two current branches;

a plurality of measuring locations;

current branches of said at least two current branches each having a dedicated trigger, a dedicated capacitor, at least one measuring location of said plurality of measuring locations and a decoupling element connected in series, a dedicated trigger of a respective current branch of said at least two current branches activating said protection system in response to a current impulse supplied by a dedicated capacitor of said respective current branch of said at least two current branches during an accident, each dedicated capacitor having a predetermined capacitance and being charged with a predetermined ignition voltage;

current branches of said at least two current branches each also having an individual triggering switch, a respective individual triggering switch of said respective current branch being connected across said respective dedicated trigger and said respective dedicated capacitor of said respective current branch;

at least one common triggering switch connected in series with said parallel circuit;

means for measuring potentials at said plurality of measuring locations at least upon starting of the engine;

means for switching at least one of individual triggering switches of said at least two current branches and for switching said at least one common triggering switch from a non-conductive state to a conductive state, whereupon a capacitor in a current branch of said at least two current branches having the at least one of said individual trigger switches that has been switched into said conductive state discharges and supplies a current impulse to a dedicated trigger in said current branch having the at least one of said individual triggering switches that has been switched into said conductive state, said means for switching being responsive to the occurrence of the accident.

15. The circuit arrangement as claimed in claim 14, wherein said circuit arrangement further comprises:

test switching means for applying at least one test potential to defined switching points of the circuit arrangement in order to measure said potentials at measuring locations of said plurality of measuring locations.

16. The circuit arrangement as claimed in claim 14, wherein the circuit arrangement further comprises at least one evaluation circuit that records triggering operation of the individual triggering switches and the common triggering switch during the accident.

17. The circuit arrangement as claimed in claim 14, wherein said means for switching is a programmable microprocessor that is operatively connected to individual triggering switches of said at least two current branches and said at least one common triggering switch.

18. The circuit arrangement as claimed in claim 17, wherein the circuit arrangement further comprises a display, and wherein the programmable microprocessor checks the potentials of measuring locations of said plurality of measuring locations at least during the starting of the engine of the vehicle and displays on said display any deviations from predetermined potentials.

* * * * *